Sept. 15, 1931.  D. S. DE LAVAUD  1,823,389
DIFFERENTIAL GEAR PROVIDED WITH PROPPING ROLLERS
Filed Jan. 3, 1928  7 Sheets-Sheet 1

Inventor
Dimitri Sensaud de Lavaud,
by H. B. Wilson & co
Attorneys

Sept. 15, 1931.  D. S. DE LAVAUD  1,823,389
DIFFERENTIAL GEAR PROVIDED WITH PROPPING ROLLERS
Filed Jan. 3, 1928  7 Sheets-Sheet 3

Fig. 4

Inventor
Dimitri Sensaud de Lavaud,
by H. B. Wilson & Co.
Attorneys

Sept. 15, 1931.   D. S. DE LAVAUD   1,823,389
DIFFERENTIAL GEAR PROVIDED WITH PROPPING ROLLERS
Filed Jan. 3, 1928   7 Sheets-Sheet 5

Inventor
Dimitri Sensaud de Lavaud,
by H. B. Willson &co.
Attorneys

Patented Sept. 15, 1931

1,823,389

UNITED STATES PATENT OFFICE

DIMITRI SENSAUD DE LAVAUD, OF PARIS, FRANCE

DIFFERENTIAL GEAR PROVIDED WITH PROPPING ROLLERS

Application filed January 3, 1928, Serial No. 244,284, and in France October 30, 1926.

The present invention for which I have filed applications in France October 30, 1926; December 10, 1926, and January 7, 1927, relates to a differential gear free from the objections and inconveniences existing in ordinary, known differential gears provided with planetary wheels. These inconveniences, particularly noticeable in heavy vehicles, arise from the fact that, under any circumstances, in the use of such mechanisms, the driving shaft necessarily transmits equal torques to the two driven shafts.

For example, if one of the driving wheels has no traction on the ground or loses it momentarily, the car ceases to be driven. As a result it may become absolutely impossible to propel the car or a very distinct limitation may be imposed on speed. The curves are limited by the adherence of the inner wheel as soon as the center of gravity is not sufficiently low. Moreover the ordinary differential gear strictly limits the importance of the ratio between the non-suspended weight and the suspended weight.

In the differential gear forming the subject-matter of this invention, the actuation of the driving wheels allows their differential movement while at the same time the driving action of one wheel does not depend on the traction of the other. The arrangement of the mechanism is such that, if one of the driving wheels tends to progress relatively to the other, it does so freely without, however, permitting both wheels to simultaneously rotate faster than the driving crown. In other words, the wheels possess a differential freedom, without having in any case a simultaneous freedom. However, if the traction of one wheel is destroyed or diminished, a corresponding increase in driving action is transferred to the other wheel.

Proper operation is automatically ensured for forward and backward running of a car and the braking action of the engine is always available. When a wheel loses traction or takes a differential movement, the driving or braking stress is in totality transferred to the other wheel. If, however, in differential movement the driving torque or the torque resisting turning of the driveshaft exceeds the traction torque of the driving or resisting wheel, the drive is then transmitted to both wheels with a slight slipping on the ground of the wheel which first was acting as the driving wheel.

Such an operation, which is exceptional, does not present any serious inconvenience and allows the driving or braking of the car by the engine up to the limit of traction of both driving wheels.

Toward the ends mentioned the differential gear forming the subject-matter of the invention is characterized by the provision of two half axles to be driven, arranged end to end in the known manner, and connected to a common driving crown through the medium of rollers or balls in contact, on the one hand, with a cylindrical bearing portion or race of the axle and, on the other hand, with symmetrical, inclined, wedging surfaces on the crown, each half axle having its own series of rollers or balls, but both series being arranged in a common cage structure having flanges in contact with each of the half axles to provide a friction connection. The cage provided for the rollers may in certain forms of the invention be composed of two sections, one for each series of the rollers or similar wedging elements, a limited angular relative movement being permitted between the two sections, and spring means being provided to restore the sections to a normal position relative to each other. Obviously each section may be considered a separate cage if desired.

A particular feature of the invention is the provision, in a differential mechanism of the improved type mentioned, of means controllable at will for producing a free wheeling action so that the wheels of a motor car, for example, may overrun the engine, the braking effect of the latter being eliminated. The means for producing this action may operate in various ways. For example in one form of the invention it is contemplated that a friction of suitable magnitude will be applied to one of the cage sections so that movement of the rollers into a position to provide braking through the engine will be prevented.

In another form of the invention positive means may be provided to produce substantially the same effect.

The accompanying drawings illustrate, by way of example only, some forms of construction of a differential gear for motor cars embodying the above and other features.

Figure 1:
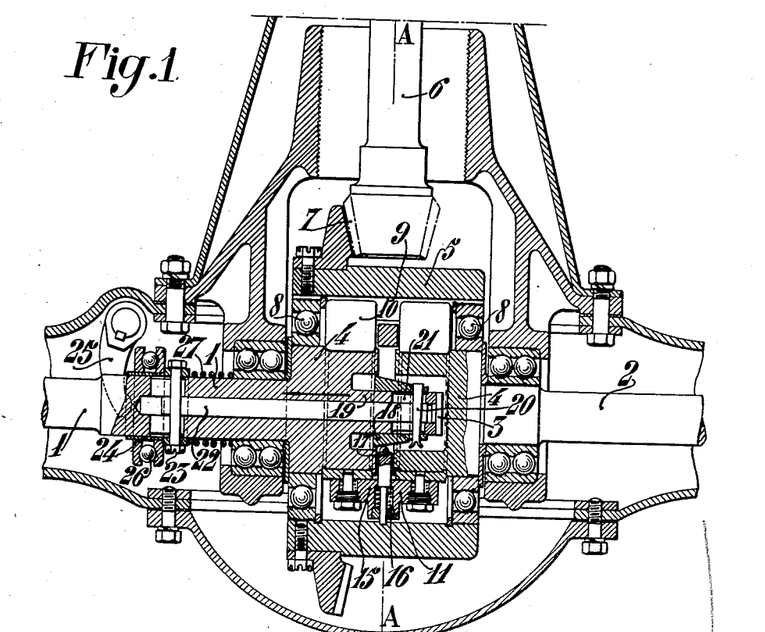
Fig. 1 is a horizontal axial section of one form of construction embodying features of the invention.
Figure 2:
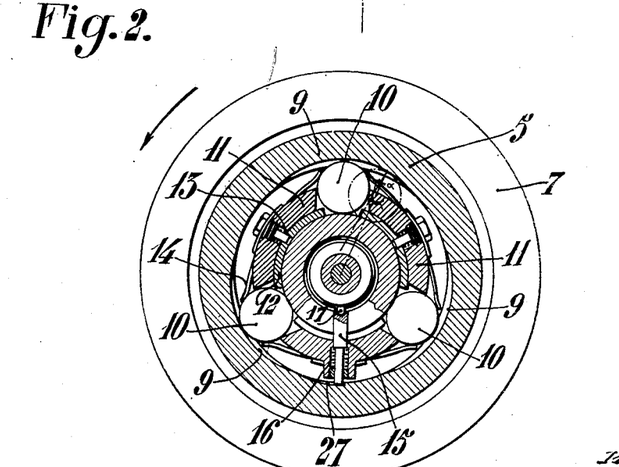
Fig. 2 is a cross section taken along line A—A of Fig. 1.

In the form of construction shown in Figs. 1 and 2, the driving axle, rigid with the wheels, is made in two parts, 1 and 2, between which is simply interposed the usual thrust bearing 3. Each half axle carries at its inner end a co-axial cylindrical hub 4.

A driving crown 5 receives its movement through teeth 7 from a Cardan shaft 6; this crown is centered and supported on the hubs 4 through bearings 8.

This crown internally carries parallel to its generating line longitudinal grooves 9 regularly distributed and the radius of which is smaller than the inner radius of the said crown. Between each hub 4 and the bottom of a groove 9 is interposed a wedging roller 10; the radius of the rollers 10 and that of the grooves or inclined surfaces 9 are so determined that on either side of its central position each roller may wedge itself—that is to say the straight line joining the contacts forms with the radii, at the points of contact, angles α (Fig. 2) considerably smaller than the friction angle of repose of the contacting surfaces.

The equidistance of the rollers 10 is exactly maintained by a common cage 11 which is maintained in frictional contact with each of the half axles through the provision of any suitable devices, such for instance as cast-iron segments 12 and springs 13 which force these elements against the hubs 4 of the half axles. This cage 11 also carries springs 14, or equivalent means, adapted to constantly press the rollers 10 against the hubs 4 and to compensate the action of the centrifugal force on the said rollers.

The operation of the apparatus is as follows:

Assuming first that the driving crown 5 is driven for forward or backward running, as for instance in the direction of the arrow (Fig. 2), this crown in moving immediately wedges all the rollers 10 between its inclined surfaces 9 and the hubs 4, the rollers and grooves assuming the position shown in dot and dash lines in Fig. 2.

The driving of the axles takes place as if the crown 5 and the hubs 4 were forming a rigid structure. In rounding a curve the wheel external to the curve and its half axle tend to progress relatively to the inner wheel. The rollers 10 corresponding to this external wheel release themselves from the wedging engagement with the grooves 9 and the differential movement takes place by simple slipping of the inner hub 4, related to this wheel, on the rollers 10, the very small friction then developed being unobjectionable since it does not take place under load.

However, the rollers 10 thus released remain in contact with their wedging surfaces as the cage 11, held by the wedging action of the row of rollers corresponding to the wheel on the inner side of the curve, continues to ensure this contact. The friction between the hub 4, which is slipping, and the cage 11 is then without effect since the cage 11 is locked against the forward movement by the other series of wedged rollers. The same sort of operation takes place in both directions of running.

If it is now assumed that in going down a hill, or with the gas feeding pipe sufficiently throttled, the two wheels, and consequently the entire axle, tend to progress relatively to the driving crown 5, the friction exerted between the surfaces of the hubs and the common cage 11 of the rollers 10 will cause the hubs to drive the cage and the rollers. These latter immediately lock themselves in the other wedging position corresponding, in their relation to the inclined surfaces of the grooves, to a backward running condition and the engine will exert its braking action.

If, under these conditions, the car rounds a curve, the wheel internal to the curve tends to rotate less quickly and it is its half axle which becomes released from the wedging engagement. The braking action is then transferred in totality onto the other wheel. If, however, the braking exceeds the traction or adherence to the ground of this wheel, the latter slightly slips until the other wheel also sets up resistance and the limit of the braking is the total adherence of both wheels.

It is possible to combine with the apparatus which has just been described a driving device allowing, at will, the operation as free wheel, when going down hill or when the gas feeding pipe is throttled; such an operation allows, besides the pleasure it affords, the realization of a substantial economy in fuel.

For that purpose it suffices that the common cage 11 should be prevented, for instance by means of an abutment or stop on the driving crown 5, from bringing the rollers 10 into the second mentioned or advanced wedging position used for the braking by the engine. Both wheels can then simultaneously progress as free wheels.

Such a drive can be realized by any suitable device; it suffices, for instance, to control the displacement of a stop finger 15 rigid either with the cage 11 or with the crown 5 and bearing against an abutment of the crown or of the cage. If the finger 15 is rigid with the cage 11, its actuation can be easily effected through the interior of one of the half axles.

In the form of construction illustrated in the accompanying drawings, the finger is constituted by a small piston completely free relatively to the axle, mounted in a radial opening through the cage 11 and subjected to the action of a spring 16 which constantly presses its inner end, provided with a ball 17, against a truncated, conical cam 18 mounted on a central bearing portion 19 of one of the hubs 4.

The cam 18 is angularly connected to the hub 4 by a diametral key 20 which can slide in grooves 21 and passes through the end of an operating rod 22 arranged in an axial bore through the axle. At its outer end the rod 22 is connected for translational movement, by the shank of a bolt 23, to a slide-block 24 mounted on the axle. A fork 25, pivoted at a fixed point relative to the flared portion of the axle, bears upon the slide-block 24 through the medium of a thrust bearing 26, while a spring 27 serves to return the slide-block and the rod in the direction of the arrow (Fig. 1). The fork 25 is actuated by the driver of the vehicle by means of any suitable linkage or mechanism.

When the cam 18 is pushed in a reverse direction to that indicated by the arrow (Fig. 1), the finger 15 enters a notch 271 in the driving crown 5. This notch acts as an abutment only for a single direction of relative movement between the cage and crown. If the cam 18 is moved too late, i. e., after the cage has shifted to the engine braking position, all that is necessary is to slightly accelerate the engine to the point where it drives the wheels, thus shifting the cage and permitting the engagement to take place. The engagement being effected, it will be seen that if the crown 5 rotates faster than the wheels in the direction of advance shown by the arrow of Fig. 2, it can move relatively to the cage, thus permitting the connection with the axles by a wedging action between the latter and the crown 5. If the wheels have a tendency to rotate more rapidly than the crown, the axles freely rotate relatively to the cage 11 and crown 5, the opposite wedging action not being able to take place owing to the fact that the finger 15 prevents the angular displacement of the cage 11, necessary for the production of the wedging action. The free wheel movement is thus obtained.

The second form of construction (Figs. 3 and 4) involves an improvement which consists in forming the common cage of the wedging rollers in two parts or as two separate elements which are resiliently connected, each part receiving, preferably without appreciable play, in its recesses, one of the series of wedging rollers or balls.

Preferably the connection between the two parts of the common cage will take place through resilient rods passing through alined holes formed in the two parts parallel to the axis.

It is to be noted that the resiliency or restoring force of the connecting rods, relatively to the friction of the cage on the half axles, must be so chosen as to be of sufficient magnitude to permit the release of one series of wedging rollers when the half axle relating to this series has a tendency to progress relatively to the other, without, however, permitting the wedging of this series of rollers in the opposite or advance portions of the grooves.

According to the improvement indicated, the cage 11 for the rollers 10 is made in two parts, $11^a$ and $11^b$, resiliently connected by distortable rods 28 arranged in holes 29 and 30 formed in the parts $11^a$ and $11^b$ parallel to the axis. The holes 29 and 30 are enlarged at $29^a$ and $30^a$ for permitting the distortion of the rods 28.

Figure 3:
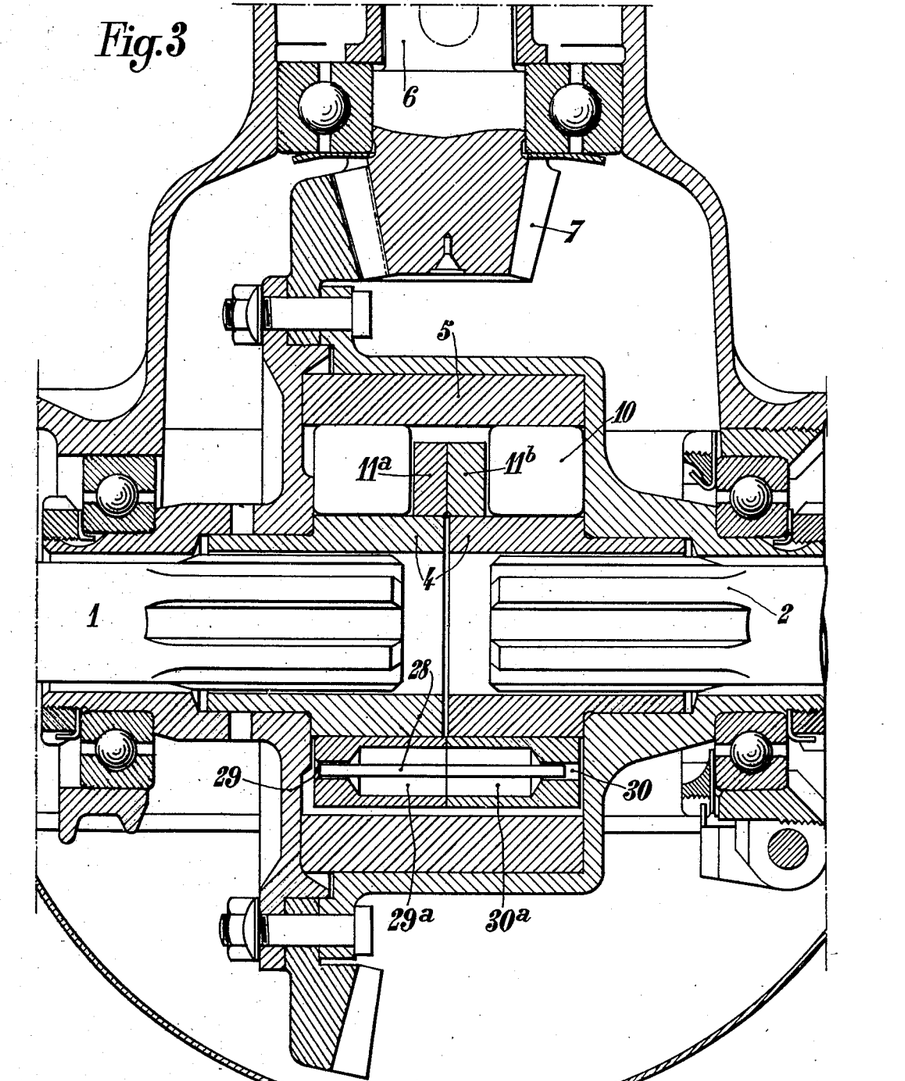
Fig. 3 is a horizontal view of a modified form of construction.
Figure 4:
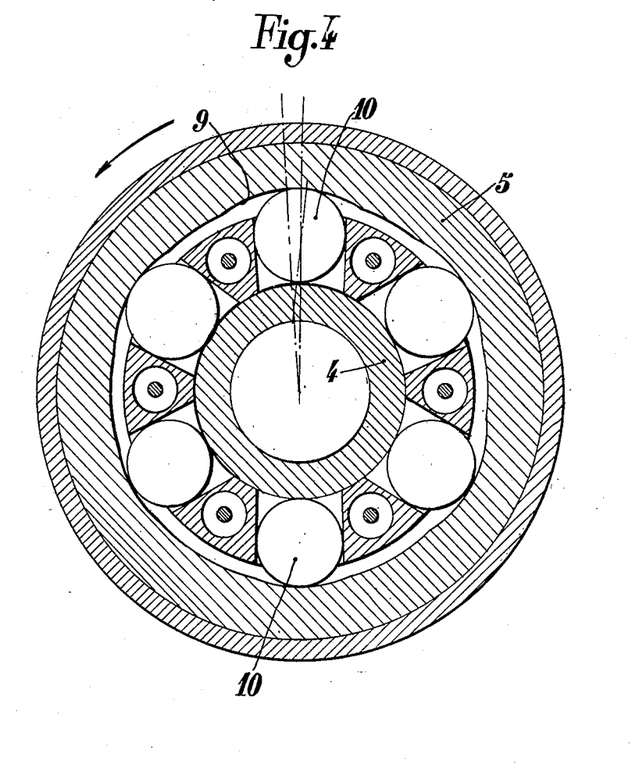
Fig. 4 is a vertical sectional view through one of the half axles of Fig. 3.
Figure 5:
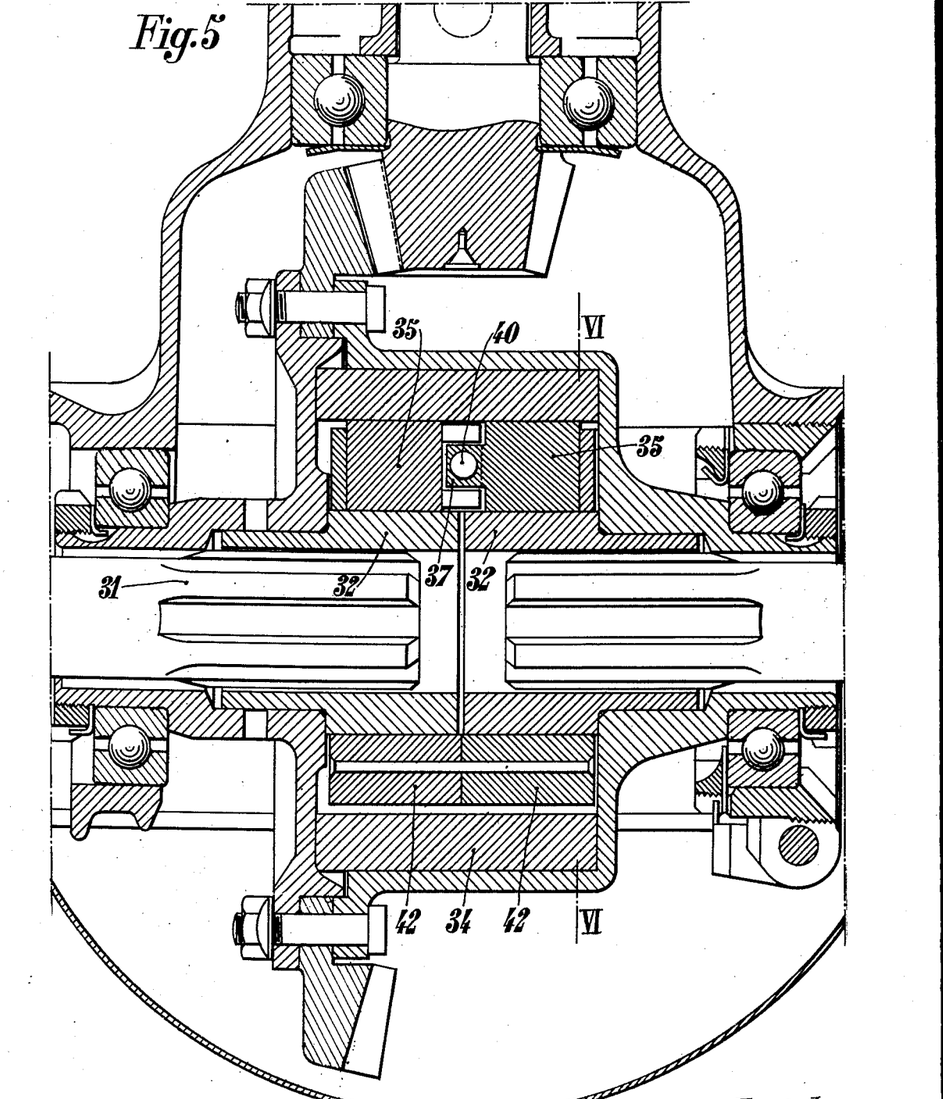
Fig. 5 is a horizontal plan view taken along line V—V of Fig. 6 showing a third form of construction.
Figure 6:
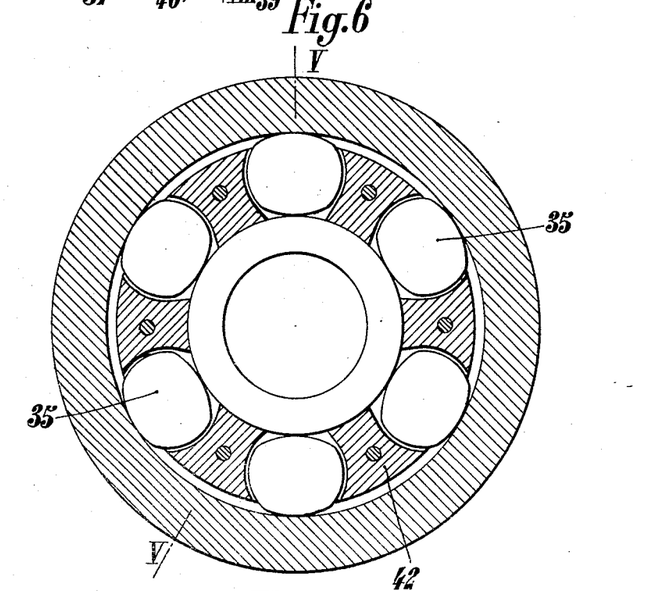
Fig. 6 is a vertical sectional view taken along line VI—VI of Fig. 5.
Figure 7:
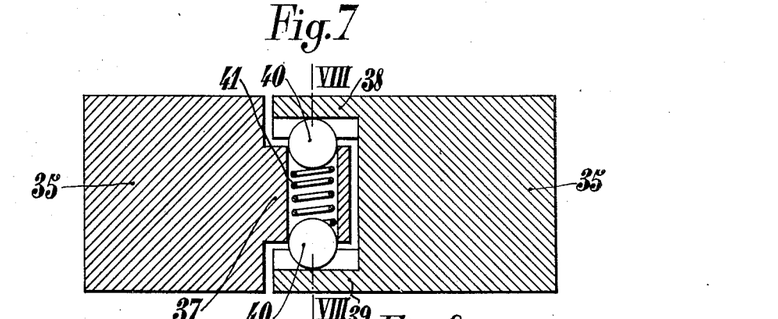
Fig. 7 is a sectional view of a detail on an enlarged scale taken along a plane through the axis of a pair of cam elements showing the connection between the same.
Figure 8:
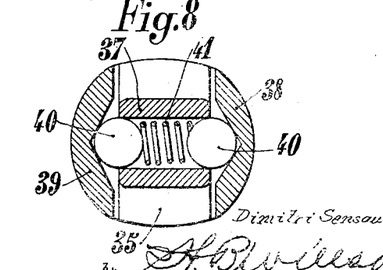
Fig. 8 is a section taken along line VIII—VIII of Fig. 7.

Of course other means might be used for resiliently connecting the two cages or parts of the common cage relating to both series of rollers. Such modifications are obviously included in the scope of the invention. The construction of the driving member, including the crown 5, and the method of mounting this member in relation to the driven members may also be modified as shown in Fig. 3.

The third form of construction (Figs. 5 to 8) is mainly characterized by the fact that the actuation of each of the two half axles instead of taking place by the wedging of rollers between inclined surfaces takes place by the wedging of rows of cams interposed between the half axles and a concentric driving crown; it is characterized, moreover, by the fact that the wedging cams of both rows are connected in pairs by a resilient connection permitting a certain relative torsion or angular displacement between the two associated cams; it is still further characterized by the fact that the cams are arranged in a common cage. It is obvious that a differential gear in accordance with the invention may present only one of the above mentioned features, or it may involve the combination of several of these features.

The inner end of each of the driving half axles 31 carries a co-axial cylindrical hub 32 keyed or splined or connected by any other means to the axle. The casing 31 of the differential gear internally carries a co-axial cylindrical crown 34.

Between each hub 32 and the crown 34 is interposed without play an annular series of wedging cams 35, preferably of oval or substantially cylindrical shape. The cams of both series are connected in pairs by a resilient connection normally alining or centering these cams relatively to each other but permitting them to partake of a slight relative rotation, and they are firmly or forcibly restored to their normal position of equilibrium. For this purpose, as shown in the drawings, one of the cams carries a boss 37 provided with a laterally extending bar and arranged between two cheeks 38 and 39 of the other cam. Balls 40, on which acts a spring 41, bear in angular or V-shaped cavities formed in the cheeks 38 and 39. It will be seen that this construction permits the cams to be subjected, relatively to each other, to a torsion or angular movement in opposition to the spring 41, which, owing to the pressure against the balls 40 and to the sides of the angular cavities, brings the cams back to their normal positions. This double row of wedging cams or rollers is preferably held by a common cage 42 centered on the axle.

Any wedging cam may be conveniently employed, provided it symmetrically becomes wedged in the same manner, in one direction as in the other. The drawings illustrate cams having a profile formed by a series of circular arcs, being produced from an ordinary roll by flattening of opposite sides through enlargement of the radius of curvature of these sides. It is obvious that, in any relative movement, in one direction or the other, between the hub and the driving crown, the cam cannot roll and simply wedges itself by starting a rolling movement; the wedging angle is an increasing function of the radial expansions of the differential gear.

Any resilient form of connection between the cams, other than that described, which permits the same result to be obtained, that is to say a rotation of one cam of a pair relatively to the other with suitable restoring forces, can obviously be used.

The operation of the apparatus is as follows: Let it then be assumed that the vehicle is being propelled; in rounding a curve the external wheel progresses and the hub 32 of its half axle 31 tends to release itself from the wedging position. This release can be effected owing to the resilient connection of the two associated cams of each pair; it takes place without the wedging occurring in the opposite direction or on the other surfaces of the cams as the cams on which the external hub slides are held by the connection with the series of cams which remain wedged and thus insure the driving action. If the resilient connection between the cams did not exist, the hub could slide on the cams only under the pressure corresponding to the total resilient wedging reaction, and the wheel could not rotate freely. If both wheels tend to progress simultaneously relatively to the driving crown, the two annular series of cams simultaneously roll over and wedge themselves in the position normally assumed during backward running under the power of the engine, and the braking effect of the engine results. In this case, in rounding a curve, it is the wheel on the inner side of the curve which releases itself owing to its retarded movement.

In rounding a curve, or upon the least deviation of the front wheels, the driving is always effected by only one of the rear wheels, thus giving rise to a pivoting torque, about the vertical axis of the center of gravity, which has a tendency to produce a straightening action on the car.

Owing to the angle of inclination of the pivot of the front wheels, this pivoting torque ensures for the said front wheels a remarkable static stability, independent of the speed of the vehicle and of the amplitude of the movement of the front wheels, resulting in a substantial improvement of the stability of the vehicle on the road, the suppression of the sustained pendular movements at the front and a quite remarkable reduction in the tendency to skidding on slippery ground.

It is to be noted that if the driving torque on the axle exceeds the traction or adherence torque of a wheel, in differential movement, the rear wheel on the inner side in rounding a curve slips by overtaking the other, and the driving is effected by both wheels until the total traction or adherence of the two driving wheels is utilized.

In the case of coasting and braking through the engine, the same reaction occurs, but in this instance it is the external wheel which slips.

Figure 9:
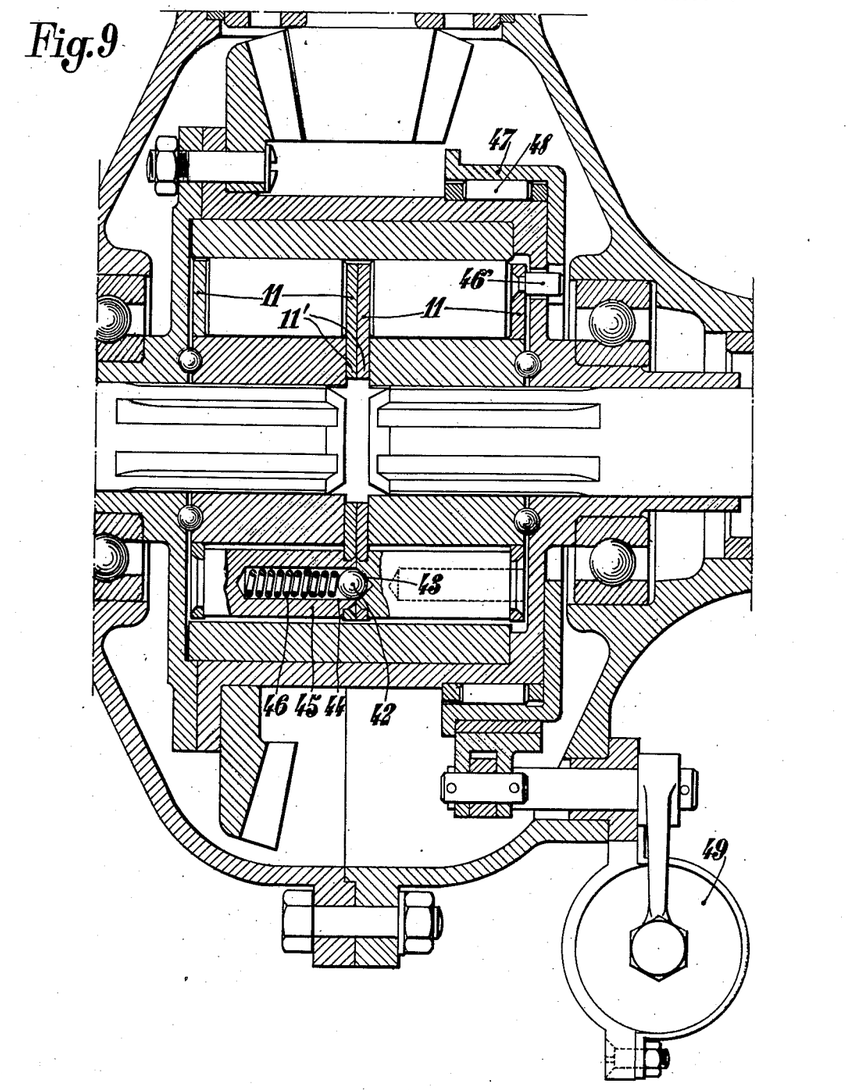
Figs. 9 and 10 illustrate in horizontal and vertical section, respectively, a fourth form of construction.
Figure 10:
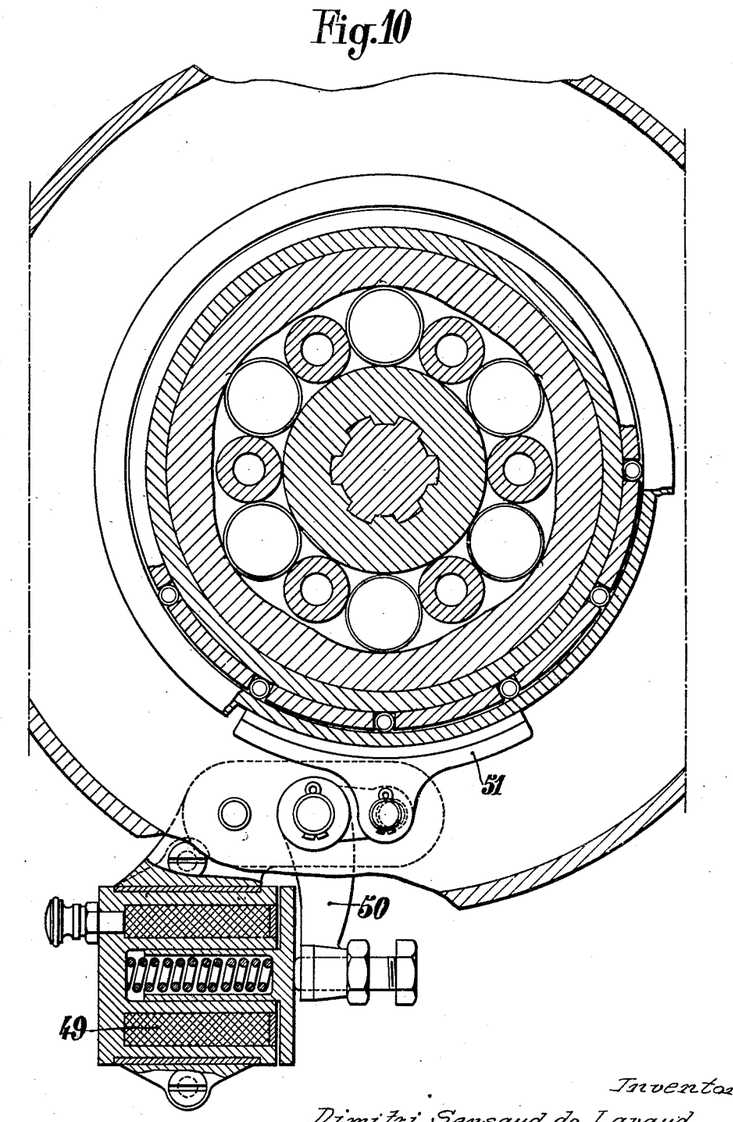

The form of construction illustrated in Figs. 9 and 10 is a modification of the arrangement shown in Fig. 1 for permitting, at will, the operation as a free wheel when going down hill, or when the gas feeding pipe is throttled. While in Fig. 1 the actuating device is constituted by purely mechanical means, this device is, in Fig. 9, constituted by electromechanical means.

The cage 11 comprises in this example two parts which are connected together by means of a ball 42 which engages with a conical recess 43 in one of the parts and slides in a hole 44 drilled into the other part of the cage and in the stay members 45. The ball is, furthermore, subjected to the action of a spring 46. The two parts of the cage are consequently resiliently connected together in a manner similar to that shown in Fig. 3. The portions 11' of the cages form ledges or shoulders adapted to engage and bear on the ends of the driven shaft or hubs 4, thereby creating friction between the latter and the cage parts.

The cage is connected by means of a stud 46' to an external drum 47 which normally rotates freely on a roller bearing 48 carried by the driving member or crown and exerts no retarding effect on the cage; however, when it is desired to obtain the operation as a free wheel, the circuit of an electromagnet 49 is closed by the driver of the vehicle. The magnet attracts an armature 50 and presses a brake shoe 51 against the drum 47, so that the cage is braked; the operation as a free wheel is consequently obtained as described with reference to Fig. 1. In this case, however, the retention of the wedging rollers to prevent their shifting into the advanced wedging position, i. e., that in which the wheels would tend to drive the engine, is effected by friction means instead of by positive means such as provided in Figs. 1 and 2. It will be obvious that the friction created by the brake shoe 51, when it is applied to the drum, must exceed the internal friction, produced primarily by the ledge or flange portions 11', which tends to shift the rollers forwardly when the car begins to coast. An advantage of this friction means is that so long as it is applied, it will permit the engine to drive the wheels in either forward or reverse while free wheeling may take place whenever the wheels overrun the engine. On the other hand, if the braking effect of the engine is desired, it may be obtained by releasing the brake shoe.

Of course, the forms of construction described by way of example are capable of receiving a great number of modifications which, presenting one or more of the features of the invention, are included in the scope of the latter.

What I claim as my invention and desire to secure by Letters Patent is:—

1. A differential gear for transmitting power from a shaft to a pair of axially aligned driven shafts, comprising a driving member, two sets of wedging means, each interposed between the said driving member and one of the driven shafts, means for limiting the movement of the wedging means of one of the sets relatively to the other set, and means for causing at will the driven shafts to simultaneously and freely rotate with respect to the driving member.

2. A differential gear for transmitting power from a shaft to a pair of axially aligned driven shafts, comprising a driving member, two sets of wedging means, each interposed between the said driving member and one of the driven shafts, means for limiting the movement of the wedging means of one of the sets relatively to the other set, and means for controlling the position of the propping means, with respect to cooperating surfaces on the driving shaft, in order to cause at will the driven shafts to simultaneously and freely rotate with respect to the driving member.

3. A differential gear for transmitting power from a shaft to a pair of axially aligned driven shafts, comprising a driving member, two sets of wedging means, each interposed between the said driving member and one of the driven shafts, means for limiting the movement of the wedging means of one of the sets relatively to the other set, and means common to both sets of wedging means for controlling the position of the said wedging means with respect to the cooperating surfaces on the driving member, in order to cause at will the driven shafts to simultaneously and freely rotate with respect to the driving member.

4. A differential gear for transmitting power from a shaft to a pair of axially aligned driven shafts, comprising a driving member, two sets of wedging means, each interposed between the said driving member and one of the driven shafts, a cage having two parts each adapted for receiving one set of wedging means, means for limiting the movement of one of the parts of the said cage relatively to the other part of the cage, means common to both cages for controlling the position of the said cages with respect to the driving member, in order to cause at will the driven shafts to simultaneously and freely rotate with respect to the driving member.

5. A differential gear for transmitting power from a shaft to a pair of axially aligned driven shafts, comprising a driving member, two sets of wedging means, each interposed between the said driving member and one of the driven shafts, a cage having two parts each adapted for receiving one set of wedging means, means for resiliently connecting the two parts of the cage together, means common to both parts of the cage for controlling the position of the said cage with respect to the driving member, in order to cause at will the driven shafts to simultaneously and freely rotate with respect to the driving member.

6. A differential gear for transmitting power from a shaft to a pair of axially aligned driven shafts, comprising a driving member, two sets of wedging means, each interposed between the said driving member and one of the driven shafts, a cage having two parts each adapted for receiving one set of wedging means, means for resiliently connecting the two parts of the cage together, a friction member associated with the cage, and braking means adapted to exert at will a frictional action on the said friction member in order to cause the driven shafts to simultaneously and freely rotate with respect to the driving member.

7. A differential gear for transmitting power from a shaft to a pair of axially aligned driven shafts comprising a driving crown having wedging surfaces, two sets of wedging rollers each interposed and adapted to be wedged between the wedging surfaces of the crown and one of the driven shafts, a cage having two parts each adapted for receiving one set of rollers, means for resiliently connecting the two parts of the cage together, a friction drum associated with one of the parts of the cage, and braking means adapted to exert at will a frictional action on the said friction member in order to cause the driven shafts to simultaneously and freely rotate with respect to the driving member.

8. A differential gear for transmitting power from a shaft to a pair of axially aligned driven shafts, comprising a driving member, two sets of wedging means, each interposed between the said driving member and one of the driven shafts, a cage having two parts each adapted for receiving one set of wedging means, resilient means housed in one of the parts of the cage, and acting in a direction parallel to the driven shafts on a member housed in a recess of the other part of the cage, the said recess having inclined faces.

9. A differential gear for transmitting power from a shaft to a pair of axially driven shafts, comprising a driving member, two sets of wedging means, each interposed between the said driving member and one of the driven shafts, a cage having two parts each adapted for receiving one set of wedging means, and having portions adapted to bear on the end face of the corresponding driven shafts, resilient means housed in one of the parts of the cage and acting in a direction parallel to the driven shafts on a member housed in a recess of the other part of the cage, the said recess having inclined faces.

10. A differential gear for transmitting power from a shaft to a pair of axially driven shafts, comprising a driving member, two sets of wedging means, each interposed between the said driving member and one of the driven shafts, a cage having two parts each adapted for receiving one set of wedging means, and having portions adapted to bear on the end face of the corresponding driven shafts, resilient means housed in one of the parts of the cage and acting in a direction parallel to the driven shafts on a member housed in a recess of the other part of the cage, the said recess having inclined faces, a friction drum associated with one of the parts of the cage, and braking means adapted to exert at will a frictional action of the said friction member in order to cause the driven shafts to simultaneously and freely rotate with respect to the driving member.

11. In a device of the class described a driving member, a coaxially mounted driven member, said members having relatively inclined opposed faces, wedging elements adapted to be wedged between said faces, a cage for retaining said elements in a definite spaced relation, said cage being shiftable with relation to one of said members in either direction to couple said members for driving in a corresponding direction, a radially movable detent carried by said cage adapted to engage a shoulder on said one of said members to prevent shifting of said cage relative to said member in one direction, and means for controlling said detent at will.

12. A gearless differential comprising a pair of coaxial driven members, a rotating driving member coaxial with said driven members, wedging elements adapted to be wedged between said driving and driven members to effect a two-way driving connection in either direction, and means operable at will for disabling said connection in one direction to permit free rotation of both said driven members.

13. A gearless differential comprising a pair of coaxial driven members, a rotating driving member coaxial with said driven members, wedging elements adapted to be wedged between said driving and driven members to effect a two-way driving connection to transmit a torque in either direction, and means operable at will for partially disabling said connection to permit free rotation of both said driven members.

14. A gearless differential comprising a pair of coaxial driven members, a rotating driving member coaxial with said driven members, wedging elements adapted to be wedged between said driving and driven members to effect a two-way driving connection to transmit a torque in either direction, and means operable at will for preventing wedging of said elements in a way to effect driving of said driving member by said driven members.

15. A gearless differential comprising a pair of coaxial driven members, a driving member coaxial with said driven members, wedging elements adapted to be wedged between said driving and driven members to effect a driving connection in either direction, and a positive detent operable at will for disabling said connection in one direction.

16. A gearless differential comprising a pair of coaxial driven members, a driving member coaxial with said driven members, wedging elements adapted to be wedged between said driving and driven members to effect a driving connection to transmit a torque in either direction, and a positive detent operable at will for partially disabling said connection to permit free rotation of both said driven members.

17. A gearless differential comprising a pair of coaxial driven members, a driving member coaxial with said driven members, wedging elements adapted to be wedged between said driving and driven members to effect a driving connection to transmit a torque in either direction, and friction means operable at will for partially disabling said connection to permit free rotation of both said driven members.

18. A gearless differential comprising a pair of coaxial driven members, a driving member coaxial with said driven members, wedging elements adapted to be wedged between said driving and driven members to effect a driving connection to transmit a torque in either direction, and friction means operable at will for preventing wedging of said elements in a way to effect driving of said driving member by said driven members.

19. A gearless differential comprising a pair of driven members, a driving member, said members being coaxially arranged, a series of wedging elements between said driving member and each of said driven members to effect a driving connection in either direction, separable cage means for retaining the elements of each series in a definite spaced relation, and resilient means extending transversely of said cage means permitting a limited displacement between the cage means.

20. A gearless differential comprising a pair of driven members, a driving member, said members being coaxially arranged, a series of wedging elements between said driving member and each of said driven members to effect a driving connection in either direction, separable cage means for retaining the elements of each series in a definite spaced relation, and resilient rods extending parallel to the axis of said members and joining said cage means, said rods permitting a limited relative angular movement between the cage means and serving to restore the same to a normal relative position.

21. A gearless differential comprising a pair of driven members, a driving member, said members being coaxially arranged, a series of wedging elements between said driving member and each of said driven members to effect a connection in either direction, separable cage means for retaining the elements of each series in a definite spaced relation, one of said cage means being provided on one side with a recess having oppositely inclined camming faces, a push piece adapted to cooperate with said recess, and a spring housed in the other of said cage means for urging said push piece into said recess, whereby said cage means are permitted a limited relative angular movement and are restored to a normal relative position.

22. A gearless differential comprising a pair of driven members, a driving member, said members being coaxially arranged, a series of wedging elements between said driving member and each of said driven members to effect a driving connection in either direction, separable cage means for retaining the elements of each series in a definite spaced relation, resilient connections between said cage means permitting limited relative movement therebetween to allow one series of elements to be wedged and the other series to be free during differential movement between the driven members, and means for holding both cage means relative to one of said members to permit said driven members to overrun said driving member.

23. A gearless differential comprising a pair of driven members, a driving member, said members being coaxially arranged, a series of wedging elements between said driving member and each of said driven members to effect a driving connection in either direction, separable cage means for retaining the elements of each series in a definite spaced relation, resilient connections between said cage means permitting limited relative movement therebetween to allow one series of elements to be wedged and the other series to be free during differential movement between the driven members, and means for holding both cage means relative to one of said members to permit said driven members to overrun said driving member, said last mentioned means acting directly on one of said cage means and holding the other through said resilient connections.

24. A gearless differential comprising a pair of driven members, a driving member, said members being coaxially arranged, a series of wedging elements between said driving member and each of said driven members to effect a driving connection in either direction, separable cage means for retaining the elements of each series in a definite spaced relation, resilient connections between said cage means permitting limited relative movement therebetween to allow one series of elements to be wedged and the other series to be free during differential movement between the driven members, and a positive detent operable at will for arresting said cage means relative to one of said members to prevent shifting of said wedging elements into wedging relation in one direction.

25. A gearless differential comprising a pair of driven members, a driving member, said members being coaxially arranged, a series of wedging elements between said driving member and each of said driven members to effect a driving connection in either direction, separable cage means for retaining the elements of each series in a definite spaced relation, resilient connections between said cage means permitting limited relative movement therebetween to allow one series of elements to be wedged and the other series to be free during differential movement between the driven members, and a positive detent operable at will for arresting said cage means relative to one of said members to prevent shifting of said wedging elements into wedging relation in one direction, said detent acting directly on one cage means and arresting the other through said resilient connections.

26. A gearless differential comprising a driving member, a pair of driven members coaxial therewith, a series of wedging elements mounted between said driving member and each driven member and adapted to be shifted relative to one of said members to couple said members for rotation in either direction, separate cage elements for each of said series of elements, and means including a spring mounted in a transversely extending pocket in one of said cage elements and a push piece urged by said spring against oppositely inclined camming surfaces on the other of said cage elements for resiliently maintaining said elements in a definite relation.

27. A gearless differential comprising a driving member, a pair of driven members coaxial therewith, a series of wedging elements mounted between said driving member and each driven member and adapted to be shifted relative to one of said members to couple said members for rotation in either direction, separate cage elements for each of said series of elements, means including a spring mounted in a transversely extending pocket in one of said cage elements and a push piece urged by said spring against oppositely inclined camming surfaces on the other of said cage elements for resiliently maintaining said elements in definite relation, and means operable at will for limiting the shifting of said wedging elements relative to said one member to permit the driven members to overrun said driving member.

28. A differential mechanism comprising a driving member, two driven members, two-way connections between said driving and driven members for either direction of rotation, said connections permitting differential movement between said driven members, and means operable at will for partially disabling said connections to permit said driven members to simultaneously overrun said driving member.

29. A differential mechanism comprising a driving member, two driven members, two-way connections between said driving and driven members for either direction of rotation, said connections permitting differential movement between said driven members, and friction means operable at will for partially disabling said connections to permit said driven members to overrun said driving member.

30. A differential mechanism comprising a driving member, two driven members, two-way connections between said driving and driven members for either direction of rotation, said connections permitting differential movement between said driven members, and a positive detent controllable at will for partially disabling said connections to permit said driven members to overrun said driving member.

31. A differential mechanism comprising a driving member, a plurality of driven members, wedging means interposed between said driving member and each of said driven members and adapted to provide a two-way coupling between the same, and means cooperating with said wedging means operable at will for rendering said driven members free with respect to said driving member.

32. A differential mechanism comprising a driving member, a plurality of driven members, wedging means interposed between said driving member and each of said driven members and adapted to provide a two-way coupling between the same, and means cooperable at will with said wedging means for rendering one of said driven members free with respect to said driving member.

33. A differential mechanism comprising a driving member, a plurality of driven members, a cage element associated with each of said driven members, wedging elements carried by each of said cage elements and adapted to effect a driving connection between said driving and driven members, said cage elements having a limited relative angular movement to permit differential movement between said driven members, and means including a coil spring compressed upon relative movement of said cage elements for restoring the same to a normal relation, said spring having its axis at an angle to the direction of said relative movement of the cage elements.

In testimony whereof I have signed my name to this specification.

DIMITRI SENSAUD DE LAVAUD.